United States Patent
Tritthart et al.

(10) Patent No.: US 7,092,473 B2
(45) Date of Patent: Aug. 15, 2006

(54) METHOD FOR THE SELECTION (PUNCTURING) OF DATA BITS

(75) Inventors: Arthur Tritthart, Kleinsendelbach (DE); Hans Mueller, Regensburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 1002 days.

(21) Appl. No.: 09/978,122

(22) Filed: Oct. 15, 2001

(65) Prior Publication Data

US 2002/0094051 A1    Jul. 18, 2002

(30) Foreign Application Priority Data

Oct. 17, 2000   (DE) ............................ 100 51 243

(51) Int. Cl.
*H03M 13/03*   (2006.01)
*H04J 3/12*    (2006.01)

(52) U.S. Cl. ........................ 375/372; 714/790

(58) Field of Classification Search ........... 375/259, 375/265, 295, 372; 714/781, 786, 790
See application file for complete search history.

(56) References Cited

U.S. PATENT DOCUMENTS

| | | | | |
|---|---|---|---|---|
| 3,373,404 A * | 3/1968 | Webb et al. | ............... | 714/781 |
| 4,908,827 A * | 3/1990 | Gates | ............... | 714/790 |
| 6,052,821 A * | 4/2000 | Chouly et al. | ............... | 714/790 |
| 6,160,840 A * | 12/2000 | Park | ............... | 375/141 |
| 6,690,734 B1* | 2/2004 | Lundby et al. | ............... | 375/259 |
| 6,693,889 B1* | 2/2004 | Abe et al. | ............... | 370/342 |

* cited by examiner

*Primary Examiner*—Kevin Kim

(57) ABSTRACT

A method for the selection (puncturing) of data bits from a data word in a data processing system, notably a communication system, wherein, within one cycle of operation of a working processor, the data bit or data bits of the data word that comprises n data bits are selected on the basis of a selection bit register which comprises n selection bits which indicate whether a data bit of the data word is to be selected.

23 Claims, 2 Drawing Sheets

METHOD FOR THE SELECTION (PUNCTURING) OF DATA BITS

The invention relates to a method for the selection (puncturing) of data bits from a data word in a data processing system, notably a communication system.

Methods of this kind are known and are intended to select given data bits from a data word in order to reduce the data bit stream to the desired information bits. Methods of this kind are used, for example, in the context of channel encoding in a mobile communication system such as, for example, mobile telephony.

In known methods the selection is performed in such a manner that each time only one data bit is selected from a data word in each cycle of operation of a working processor performing the selection. A second data bit can be selected from the same data word only during the next cycle of operation. Consequently, known puncturing methods are very slow; it takes a comparatively long period of time before the sampling of the relevant data is terminated. The further processing of the sampled and compressed data inherently takes a correspondingly long period of time.

It is the object of the invention to solve the above problem by providing a selection or puncturing method which is faster and more efficient than known methods.

In order to solve this problem, in a method of the kind set forth the data bit or data bits of the data word comprising n data bits are selected, within one cycle of operation of a working processor, on the basis of a selection bit register which contains n selection bits which indicate whether a data bit of the data word is to be selected.

For the selection the method in accordance with the invention utilizes a selection bit register which quasi represents a selection mask and in which corresponding selection bits are written, each of which is associated with a given data bit of the data word to be processed. The data word and the selection bit register contain the same number of bits. During a cycle of operation the working processor selects, on the basis of the specified selection pattern, those data bits from the data word that are indicated by the corresponding selection bits in the selection bit register. Thus, an arbitrary number $x \leq n$ can be selected from the data word during a single cycle of operation. Arbitrary selection schemes are feasible; such schemes are defined by the programmer and enable the extraction of arbitrary information. Because a complete data word, for example a 16-bit word, is thus processed within one cycle of operation while utilizing a corresponding 16-bit selection bit register, the sampling of the relevant data bits from a data bit stream can be performed significantly faster than in prior art.

The selected data bits are preferably first written into a buffer memory which is preferably a shift register memory. It has been found that the buffer memory is advantageously constructed as a 31-bit shift register, but it may also be larger.

Notably with a view to the further processing of the sampled data bits it is advantageous when the data bits selected within a cycle of operation are counted and, in as far as they are written in the buffer memory, are also summed so that it the number of data bits are in the buffer memory at the relevant instant is always known.

With a view to optimizing the reading out of the stored data bits from the buffer memory it is advantageous to shift, prior to the writing of new data bits, the data bits present in the buffer memory in the form of a shift register over the number of newly arriving data bits. This enables the data bits that have been present in the buffer memory for the longest time to be read out during each read step, thus realizing a first-in-first-out (FIFO) read mode.

In conformity with an advantageous embodiment of the invention the selected data bits, possibly already stored in the buffer memory, are prepared for output as a memory data word to a memory or the like while utilizing a working bit register which contains m working bits and defines the output format. This embodiment of the invention, therefore, utilizes a second register, on the basis of which the output format of the sampled data bits is defined for an arbitrary further processing operation that succeeds the bit sampling. In this case the programmer can again define an arbitrary output format by way of a corresponding occupancy of the working bit register.

The read mode itself may also be configured so as to be variable. The output of a data word stored in the buffer memory may take place in dependence on the number of data bits present in the buffer memory, that is, only after a given number x of data bits has been written. Alternatively, output can also take place after every cycle of operation of the processor. Thus, after every puncturing step it is then attempted to read a data word of a given size from the buffer memory so as to write it, for example into the further memory.

In the context of the definition of the output format it is possible to output a predetermined number of data bits from the buffer memory. Using the working bit register, a given length can thus be defined for the data word read from the buffer memory can thus be defined for each read step. For example, reading out can take place only if the buffer memory contains at least as many data bits as predetermined for output. The previously mentioned counting of the data bits written in the buffer memory continuously enables the working processor to initiate the reading out from the buffer memory only if such reading out is indeed possible in view of the bits present in the buffer memory.

In conformity with a further version of the invention the data word read out from the buffer memory is extended by addition of one or more further data bits. This extension is necessary when the number of data bits read out is smaller than the predetermined number of bits of the memory data word. For example, if a memory data word having a length of sixteen bits is again defined in conformity with the data words to be processed and the corresponding selection register, for example, in the case of a predetermined length of twelve bits of the data word to be read out from the buffer memory, the four free bits are filled as specified by the programmer. On the one hand a so-called "sign extension" operation can then be performed. If so desired, the same sign as that of the data word read out from the buffer memory is then written into the upper cells of the output data word that are still free. If this option has not been selected, each time a bit as specified by the programmer is written into the free upper cells.

Furthermore, in a further version of the invention the data word read out from the buffer memory may be shifted within the output data word. This makes it possible to arrange the data word read out in an arbitrary position within the output data word of a length of, for example sixteen bits, and to set each time the one "0" in the lower free cells ("shift left").

Overall, the method in accordance with the invention on the one hand enables very fast bit sampling or bit puncturing, while on the other hand it is also possible to configure the very rapidly sampled data simply and quickly in an arbitrary output data format.

The invention not only relates to the described method but also to a device for carrying out the described method. This device is characterized in that it includes a working processor and a data bit selection unit for selecting one or more given data bits from a data word, comprising n data bits, on the basis of a selection bit register which contains n selection bits which indicate whether a data bit of the data word is to be selected, such selection taking place within one cycle of operation of the working processor.

The device in accordance with the invention, for example, forming part of a mobile telecommunication device such as a portable telephone or the like, may advantageously be conceived such that the selection bit register can be loaded from a selection register memory which comprises a plurality of selection registers and is included in the data selection unit. This enables the loading of a given selection bit register for each data word to be loaded and processed in the context of one cycle of operation. Overall, the selection mode of operation is then extremely flexible.

Furthermore, there is advantageously provided a buffer memory which is constructed as a shift register and in which the data bits selected within one cycle of operation can be stored. Furthermore, there may be provided a counter for counting the data bits that are selected within one cycle of operation and for summing the numbers of bits of a plurality of cycles of operation. The device may be constructed in such a manner that data bits that are already present in the buffer memory can be shifted in dependence on the counted number of new data bits to be written.

For the determination of the output format of an output data word that is formed on the basis of the selected and sampled data bits that are stored in the buffer memory it has been found that it is also very advantageous to provide at least one working bit register which contains m working bits and defines the output format, which working bit register prepares the data bits read out from the buffer memory so as to output these bits in the form of an output data word. Such an output bit register basically defines how the output data word is formed or composed and how the selected data bits are arranged within the output data word.

The working bit register itself may include a first register section which constitutes the counter, which means that the counter itself forms part of the working bit register. Furthermore, there may be provided a second counter section which defines the number of data bits to be read out from the buffer memory. Finally, there may be provided a third register section whereby the data bits read out can be shifted within the output data word, thus defining the positioning of the data bits read out.

A fourth and a fifth register section make it possible to define how the output data word that consists of m data bits is to be completed when n data bits are read out from the buffer memory, where $n \leq m$. These register sections thus indicate whether a "sign extension" operation, so a repeat of the sign bit, is to take place so as to fill the cells of the output data word (for example, having a length of sixteen bits) that are still free, or whether, for example, a defined bit value is to be placed in the free cells, independently of the data bits written. Finally, there may be provided a sixth register section which enables adjustment of the output mode.

Generally speaking, the sampled bits can be read out, for example, for the purpose of storage in an output value. Storage generally takes place via a pointer which is changed after (post) or also before (pre) the actual storage (increment or decrement). In the first mode this pointer update is activated in the first mode only when the bit count is larger than or equal to the defined number, meaning that the output value is stored each time when the output is read out; the pointer update, however, may possibly be suppressed. In the second mode the pointer update is no longer suppressed, which means that the pointer update is permanently activated.

Further advantages, features and details of the invention will become apparent from the embodiment to be described in detail hereinafter as well as from the drawings.

Therein:

Figure 1:
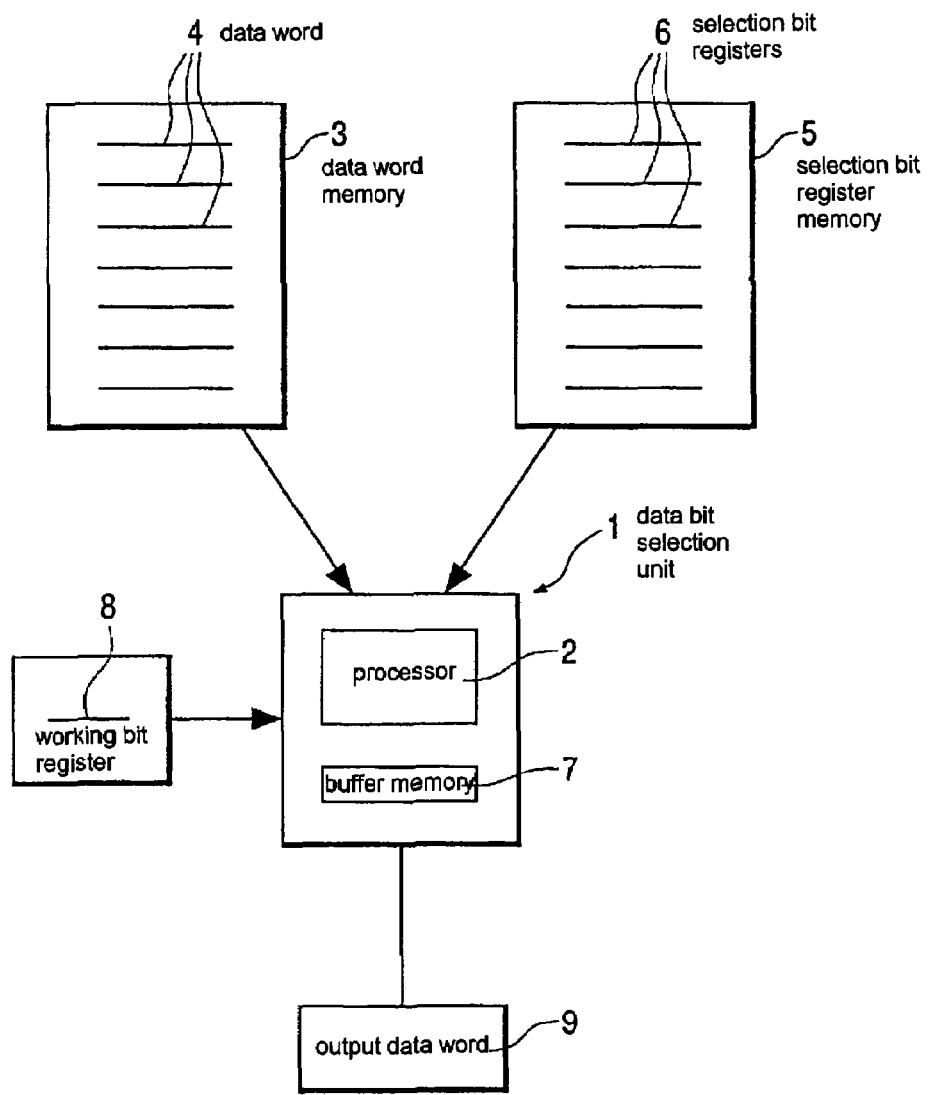
FIG. 1 shows a diagram of a device in accordance with the invention.

FIG. 1 shows diagrammatically a device in accordance with the invention which enables arbitrary desired data bits to be extracted from a data word, such extraction taking place within one cycle of operation of a working processor. It is to be noted that the present embodiment will be described on the basis of a data word having a length of sixteen bits, a selection bit register having a length of sixteen bits, a working bit register comprising sixteen bits, and an output data word having a length of sixteen bits. Other configurations, for example, eight-bit words or registers, of course, can also be used.

The device in accordance with the invention consists of a data bit selection unit 1 with an associated working processor 2. The data bit selection unit 1 loads each time a data word 4 that consists of n data bits from a data word memory 3 in order to select given data bits therefrom. Parallel to the loaded data word 4 a selection bit register 6 is loaded from a selection bit register memory 5 which includes a number of selection bit registers 6. The selection bit register also consists of n selection bits. Each selection bit is associated with a data bit of the loaded data word 4. A selection bit indicates whether the associated data bit is to be selected or not. The entire operation is performed under the control of the working processor 2. The selection of all data bits to be selected from a data word takes place within one cycle of operation of the working processor 2. Subsequently, the selected data bits are stored in a buffer memory 7. When a given output data word is to be output by said buffer memory for further processing, be it for storage in a further memory or for direct further processing, a given number of m buffered data bits is selected from the buffer memory 7 as specified by a working bit register 8, said buffered data bits subsequently being prepared so as to form and output the output data word 9. The exact operation and also the configuration of the relevant registers will be described in detail hereinafter on the basis of an example as shown in the FIGS. 2 and 3.

Figure 2:
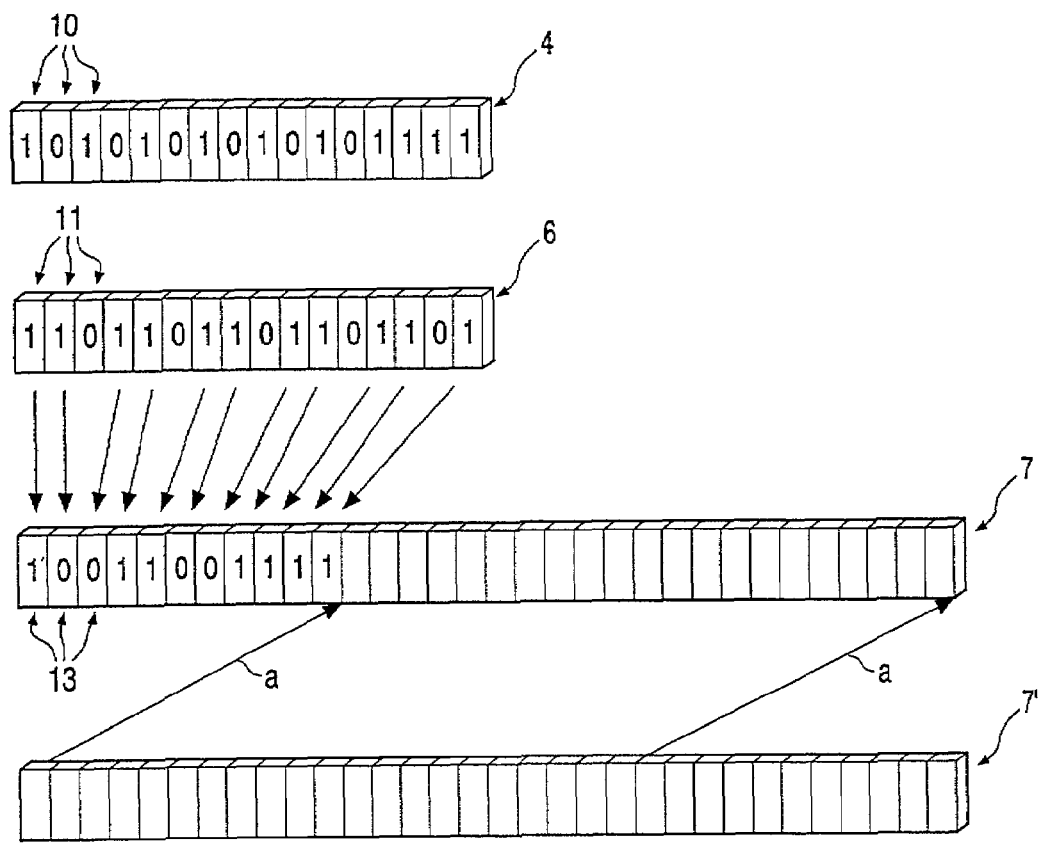
FIG. 2 shows diagrammatically the selection of data bits and the buffering in a buffer memory.

FIG. 2 shows a data word 4 which consists of a total of sixteen data bits 10 which have different values "0" and "1". With the data word 4 there is associated a selection bit register 6 which also consists of a total of sixteen selection bits 11 of different values "0" and "1" in the example shown. A respective data bit 10 is associated with each selection bit 11.

Via the selection bits 11 it is specified which associated data bit is to be selected and written into the buffer memory 7 which is in this case formed by a shift register that consists of a total of thirty-one bits 12. Each data bit 10 with which there is associated a data bit 11 having the value "1" is selected in the example shown. In this example a total of eleven data bits is selected from the data word 4 (a total number of eleven selection bits having the value "1" is written in the selection bit register 6). The selected data bits 10 are written into the corresponding bit cells of the buffer memory 7 as selection data bits 13. The foregoing operation takes place completely within one cycle of operation of the working processor 2; this means that a respective data word 4 is completely processed and all data bits to be selected therefrom are selected within one cycle of operation. The selected total number of eleven selection data bits 13 are written into the left-hand block of free bit cells of the buffer memory 7. The data bits already present in the buffer memory 7, having been written during the previous selection cycle, are shifted to the right in the shift register memory, that is, so far as new data bits are written. To this end, there is provided a counter (to be described in detail hereinafter) which counts the corresponding selection bits of the selection register 6 and controls the shift. This is represented in FIG. 2 by the buffer memory 7' which is shown underneath the buffer memory 7 and illustrates the situation before execution of the selection or puncturing step that is shown at the top. The two arrows a indicate that the relevant written bits are shifted accordingly, meaning that they have moved to the right in the buffer memory 7 as shown.

Figure 3:
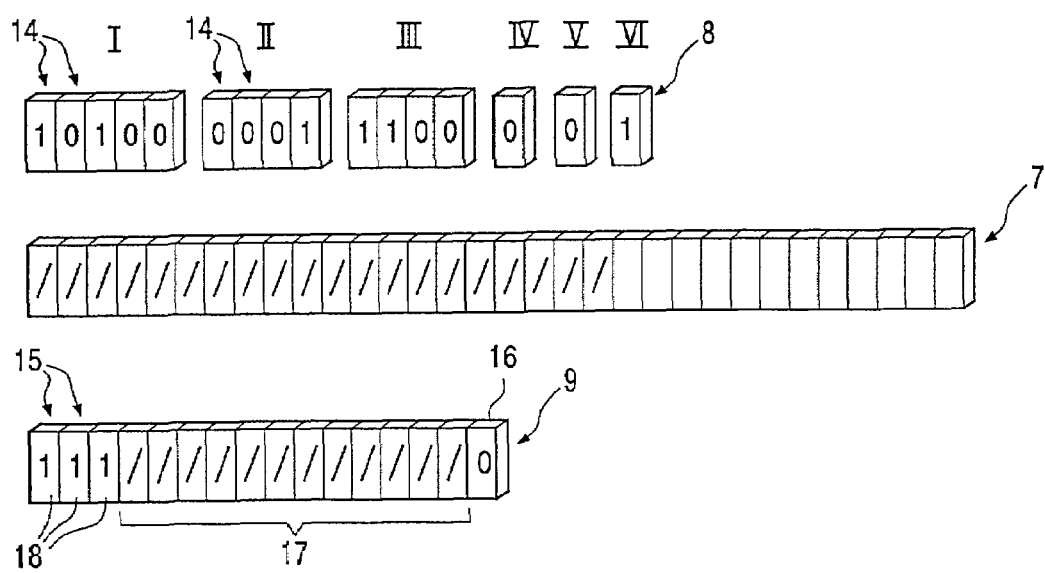
FIG. 3 shows diagrammatically the preparation of the buffered data bits on the basis of a working bit register for forming the output data word.

FIG. 3 shows the further execution of the selection or puncturing method during which the selection data bits are read out from the buffer memory 7 and prepared in conformity with a specified data format. To this end there is provided a working bit register 8 which defines the output data format. The working bit register 8 consists of a total of six register blocks I, II, III, IV, V and VI and a total of sixteen working bits 14 which are distributed accordingly between the register blocks I to VI.

The first register block I constitutes the counter which on the one hand counts the number of bits to be selected in the relevant cycle of operation so as to be written into the buffer memory 7. This knowledge is relevant in a sense that the data bits already present in the buffer memory 7 must be shifted through this number. On the other hand, the bits already present in the buffer memory 7 and the number of new bits written is summed, so that the counter also provides information as to the degree of occupancy of the buffer memory 7. Because the buffer memory 7 consists of a total of thirty-one bit cells, the counter should comprise five bits 14 for the binary representation of the number of bits.

The register section II serves to indicate where the data bits read out from the buffer memory 7 are positioned in the output data word to be formed. The data word 9 to be output also consists of a total of sixteen data bits 15. The register section II indicates whether and how many leading "0" bits have to precede the data bits read out in the output data word 9.

The register section III defines how many selection data bits 13 have to be read out from the buffer memory 7. This number may be sixteen at the most, because the output data word consists of sixteen data bits.

The register section IV defines the output mode. Depending on whether a "0" or a "1" is written therein, output will take place only if the minimum number of data bits to be read out, specified by the register section III, is reached in the buffer memory 7; this operation is carried out under the supervision of the count. This means that reading out takes place only if the count is sufficiently high and at least as many data bits have been written as have been specified by the register section III. In the other mode reading out from the buffer memory 7 is attempted after every selection cycle, irrespective of the count, and also a write attempt takes place in, for example an external memory.

Finally, the register sections V and VI serve to indicate how the free bits 15 of the output data word are to be valued when less than sixteen data bits are read out from the buffer memory 7 and when the number of leading "0" bits set is not so large that all sixteen data bits 15 of the output data word are occupied. Depending on the occupancy of the register section V, either a so-called "sign extension" could take place, meaning that the data bits of the output data word 9 that are still free are filled with bits which are the same as the sign bit of the data word read out from the buffer memory 7. Thus, the sign is repeated. In the case of a different occupancy of the register section V, the bit value predetermined in the register section VI is written.

In the embodiment shown, twenty arbitrary data bits are written in the register memory 7 as indicated by the slashes; consequently, the count in the register section I is "10100". As can be seen in the register section III, overall twelve data bits must be read out (data bit occupancy in the register section III: "1100". Each time the twelve right-hand data bits are read out.

The register section II "0001" indicates that a leading zero is to be ahead of the twelve data bits to be read out; in the output data word 9 this is represented by the data bit 16. The data bit is succeeded by the twelve data bits 17 read out. The remaining three data bits 18 are set to a value "1". The register section V contains a "0", which means that the "sign extension", that is the multiple repetition of the sign bit of the data bits read out, is deactivated and the value "1" written in the register section VI is written.

The output data word 9 thus formed is then output for arbitrary further processing, for example for storage in an external memory or the like.

When the output takes place, the bit count is decremented by the number of bits output (in this case being twelve).

Finally, a "0" is inserted in the register section IV. This means that in this case the output should take place exclusively when the count in the register section I is larger than or equal to the number of data bits to be read out as indicated in the register section III.

The method in accordance with the invention and the device in accordance with the invention can be advantageously used in a device for mobile telephony. The described method enables, for example so-called "random puncturing" (puncturing without regular repetition of the puncturing scheme); moreover, for example, separation between even and odd data bits from the incoming data words is possible. A further possibility consists in performing a so-called "hard decision bit extraction" where each time the four sign bits are selected from a data word that consists of four bit blocks comprising four bits each, such selection being performed by means of the selection bit register.

The invention claimed is:

1. A method for the selection (puncturing) of data bits from a data word in a data processing system, notably a communication system, comprising the steps of:
   providing a selection bit register which contains n selection bits associated with said data bits of said data word;
   selecting data bit or data bits of the data word comprising n data bits within one cycle of operation of a working processor, on the basis of the selection bit register, wherein each of the n selection bits indicates whether a corresponding data bit of the data word is to be selected; and writing said selected data bits into a buffer memory and summing the number of data bits written in the buffer memory.

2. A method as claimed in claim 1, wherein the data bits selected within one cycle of operation are counted.

3. A method as claimed in claim 1, wherein prior to the writing of a number of new data bits, the data bits that are already present in the buffer memory which is constructed as a shift register are shifted over the number of new data bits.

4. A method as claimed in claim 1, wherein the selected data bits, possibly already present in the buffer memory, are prepared so as to form an output data word, while utilizing a working bit register which contains m working bits and defines the output format, for output to a memory.

5. A method as claimed in claim 4, wherein the output takes place in dependence on the number of data bits present in the buffer memory or after every cycle of operation of the working processor.

6. A method as claimed in claim 4, wherein a predetermined number of data bits is output from the buffer memory.

7. A method as claimed in claim 4, wherein the data word read out from the buffer memory is extended by the addition of one or more further data bits.

8. A method as claimed in claim 4, wherein the data word read out from the buffer memory is shifted within the output data word.

9. A device for carrying out the method claimed in claim 1, including a working processor (2) and a data bit selection unit (1) for selecting one or more given data bits from a data word (4), comprising n data bits (10), on the basis of a selection bit register (6) which contains n selection bits (11) which indicate whether a data bit (10) of the data word (6) is to be selected, such selection taking place within one cycle of operation of the working processor (2).

10. A device as claimed in claim 9, characterized in that the selection bit register (6) can be loaded from a selection bit register memory (5) which comprises a plurality of selection bit registers (6) and is included in the data bit selection unit (1).

11. A device as claimed in claim 9, characterized in that there is provided a buffer memory (7) which is constructed as a shift register and in which the data bits (10) selected within one cycle of operation can be stored.

12. A device as claimed in claim 9, characterized in that there is provided a counter for counting the data bits (10) selected within one cycle of operation and for summing the numbers of bits of a plurality of cycle of operation.

13. A device as claimed in claim 11, characterized in that data bits already present in the buffer memory (7) can be shifted in dependence on the number of new data bits (10) to be written.

14. A device as claimed in claim 9, characterized in that there is provided at least one working bit register (8) which contains m working bits (14) and defines the output format, said working bit register preparing data bits read out from the buffer memory (7) so as to be output in the form of an output data word (9).

15. A device as claimed in claim 14, characterized in that the working bit register (8) includes a first register section (I) which constitutes a counter.

16. A device as claimed in claim 14, characterized in that there is provided a second counter section (II) which defines the number of data bits (13) to be read out from the buffer memory (7).

17. A device as claimed in claim 14, characterized in that there is provided a third register section (III) whereby the data bits (15) read out can be shifted within the output data word (9).

18. A device as claimed in claim 14, characterized in that there are provided a fourth and a fifth register section (IV, V) which define how the output data word (9), consisting of m data bits (15), is to be completed when n data bits are read out from the buffer memory (7), where n<m.

19. A device as claimed in claim 14, characterized in that there is provided a sixth register section (VI) whereby the output mode can be adjusted.

20. A device as claimed in claim 19, characterized in that a first bit is written or can be written into the sixth register section (VI) and a selection between a first output mode in which the updating of a pointer, that can be updated before or after reading out and indicates a memory location, is suppressed until the count of the counter is smaller than or equal to a defined number, and a second mode in which updating of the pointer is permitted, irrespective of the count, is made on the basis of the value of the bit written in the sixth register section (VI).

21. A device as claimed in claim 9, characterized in that it forms part of a portable telecommunication device for mobile telecommunication.

22. A method for the selection (puncturing) of data bits from a data word in a data processing system, notably a communication system, comprising the steps of:
   providing a selection bit register which contains n selection bits associated with said data bits of said data word; and
   selecting data bit or data bits of the data word comprising n data bits within one cycle of operation of a working processor, on the basis of the selection bit register, wherein each of the n selection bits indicates whether a corresponding data bit of the data word is to be selected; and
   preparing said selected data bits so as to form an output data word, while utilizing a working bit register which contains m working bits and defines the output format, for output to a memory.

23. A method for the selection (puncturing) of data bits from a data word in a data processing system, notably a communication system, comprising the steps of:
   providing a selection bit register which contains n selection bits associated with said data bits of said data word; and
   selecting data bit or data bits of the data word comprising n data bits within one cycle of operation of a working processor, on the basis of the selection bit register, wherein each of the n selection bits indicates whether a corresponding data bit of the data word is to be selected; and
   writing said selected data bits into a buffer memory constructed as a shift register so that prior to the writing of a number of new data bits, the data bits that are already present are shifted over the number of new data bits.

* * * * *